United States Patent [19]

Roberts

[11] 4,169,675
[45] Oct. 2, 1979

[54] MICROFICHE DUPLICATOR

[75] Inventor: William E. Roberts, Palos Verdes Penn., Calif.

[73] Assignee: AM International, Inc., Los Angeles, Calif.

[21] Appl. No.: 894,219

[22] Filed: Apr. 7, 1978

Related U.S. Application Data

[63] Continuation of Ser. No. 652,635, Jan. 26, 1976, abandoned.

[51] Int. Cl.² .............................................. G03B 27/04
[52] U.S. Cl. ......................................... 355/85; 355/70; 355/99; 355/113
[58] Field of Search ............... 355/99, 85, 113, 46–70; 362/3, 16, 268

[56] References Cited

U.S. PATENT DOCUMENTS

| | | | |
|---|---|---|---|
| 2,740,061 | 3/1956 | Reeves | 355/99 X |
| 2,953,984 | 9/1960 | Hofstetter | 355/99 X |
| 3,416,862 | 12/1968 | Levin | 355/70 |
| 3,723,001 | 3/1973 | Zeunen et al. | 355/99 X |
| 3,754,827 | 8/1973 | Okada | 355/113 |
| 3,936,186 | 2/1976 | Boland et al. | 355/85 X |
| 3,988,537 | 10/1976 | Cooley | 355/67 X |

Primary Examiner—Richard A. Wintercorn
Attorney, Agent, or Firm—M. A. Kondzella; G. Jameson

[57] ABSTRACT

Apparatus for duplicating microfiche, which is of moderate cost yet which operates rapidly to make duplicates of high quality from both jacketed and unjacketed microfiche. A relatively uniform and collimated light source is provided for use with jacketed microfiche, by utilizing a bank of fluorescent aperture lamps and a bank of cylindrical lenses between the lamps and microfiche, with the side of the lenses closest to the microfiche being flattened and with the lenses having baffles of lower index of refraction than the clear segments of the lenses. A developing station for holding gaseous ammonia or other developing medium, is sealed by an inflatable seal.

5 Claims, 9 Drawing Figures

MICROFICHE DUPLICATOR

This is a continuation, of application Ser. No. 652,635 filed Jan. 26, 1976 now abandoned.

BACKGROUND OF THE INVENTION

The increasing use of microfiche has given rise to the need for a duplicator which is economical and which makes copies rapidly with a minimum of involvement by the operator. Such a machine requires a relatively simple and rapid imaging station where the image of an original microfiche can be accurately formed on a copy sheet, even for that type of microfilm commonly referred to as a "jacket" which includes a multipocketed carrier containing strips of microfilm. The machine also requires a simple and rapid developing station where the copy sheet with the image thereon can be subjected to a developing medium such as anhydrous ammonia. The machine further requires a simple and reliable transport mechanism for moving the sheet through the imaging and developing stations to an output hopper.

SUMMARY OF THE INVENTION

In accordance with one embodiment of the present invention, a relatively simple and reliable microfiche duplicating apparatus is provided which operates rapidly to provide high quality duplicates of both jacketed and unjacketed original microfiche. The apparatus includes an imaging station having a mechanism for holding the original or master fiche and the copy sheet tightly against one another, and a bank of aperture fluorescent lamp which provide substantially uniform illumination of the microfiche to form an image on the copy sheet. In applications where high image quality is required, and where the master emulsion and copy emulsion may not be in intimate contact, a bank of cylindrical lenses is positioned between the lamps and the film plane of the microfiche to provide better collimation. The cylindrical lenses are flattened, or in other words formed at larger radii of curvature, along the sides nearest the film plane to provide a more uniform light distribution on the film plane, the flattening also somewhat increasing the collimation. Where improved collimation is required, each lens is provided with numerous opaque baffles spaced along the length of the lens. Each baffle is constructed of opaque material of a lower index of refraction than the clear lens material, so that some light falling on the opaque baffles is refracted to fall on the film plane, to thereby increase the intensity of the light.

A developing station, where the image on a copy sheet is developed, includes a pair of closely spaced plates between which the copy sheet is received, and a ring-shaped inflatable seal surrounding an area between the plates. When the copy sheet is inserted between the plates, the seal is inflated and a developing fluid such as ammonia vapor is injected into the chamber. The transport for moving the copy sheet into the chamber and out of it, includes a thin metal strip which fits between the plates and which can move the copy sheet between the plates by pushing it thereto, the pusher strip then withdrawing rearward of the inflatable seal. After the copy sheet has been developed and the seal is deflated, the pusher strip moves forward again, but to an even further forward position, to push the copy sheet out of the region between the plates.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
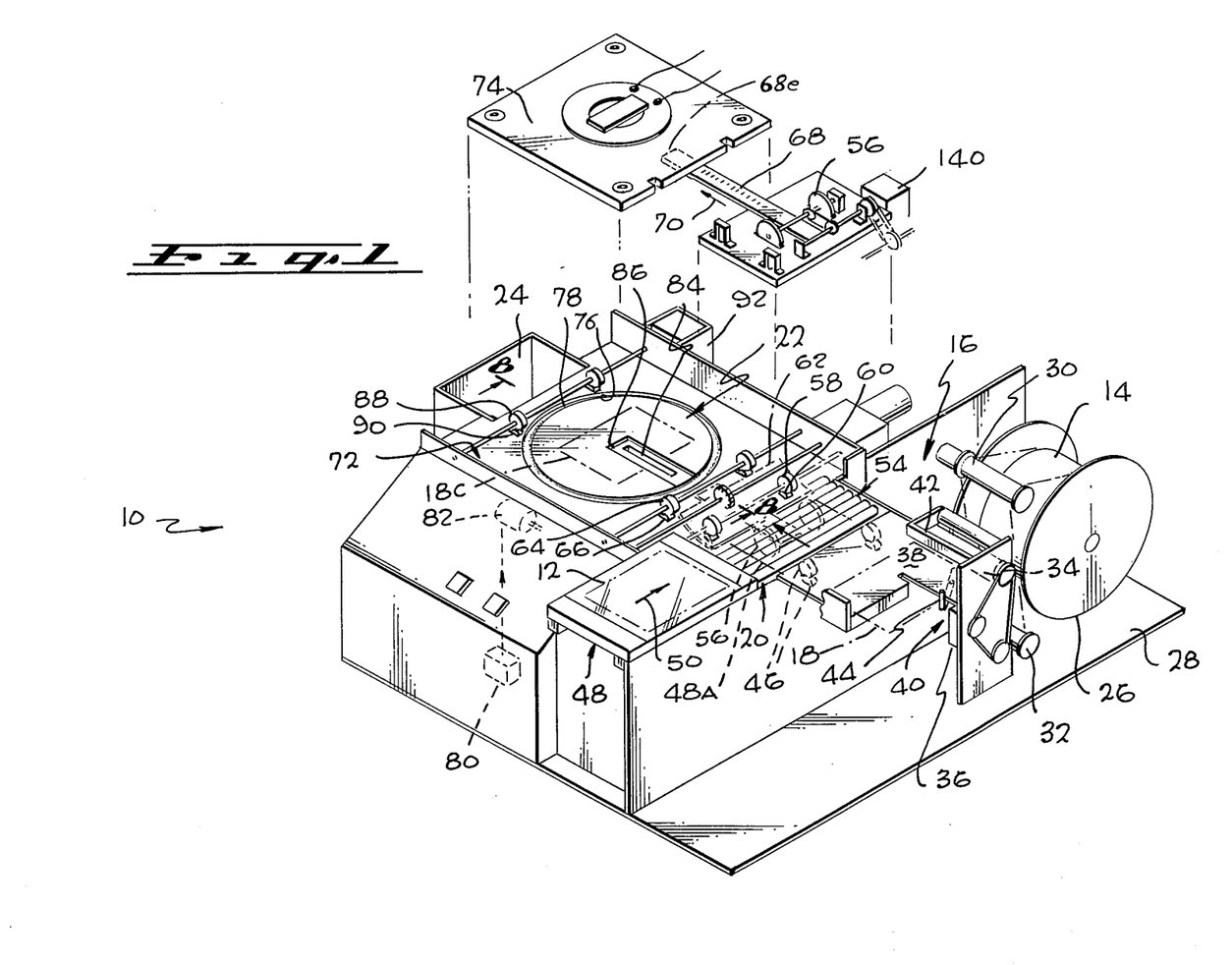
FIG. 1 is a partial exploded perspective view of a microfiche duplicator constructed in accordance with the present invention.

FIG. 1 illustrates a microfiche duplicating machine 10 which can receive an original or master microfiche 12 of which a duplicate is to be made, and which holds a roll of light-sensitive microfiche copy material 14 which is to be cut into sheets that will be transformed into microfiche copies of the master microfiche. The machine includes a cutting station 16 where the web of copy material is cut into copy sheets 18, an imaging station 20 where the image on the master 12 is formed onto the copy sheet 18, a developing station 22 where the copy sheet with the image thereon is developed, and an output basket 24 where the developed microfiche copy is received.

The web 14 of copy material is held on a large supply roll 26 which is rotatably mounted on a frame 28 of the machine. The web of copy material extends around a group of rollers 30, 32, 34 to the cutting station 16. At the beginning of each cycle, a motor 36 drives one of the rolls 34 that feeds a length of the copy material onto a holding platform 38. A cutting mechanism 40, which is also driven by the motor 36, then operates a cutting blade 42 that cuts the web to form a copy sheet 18. A feed bar with a finger 44 at one end, is then pivoted to push the copy sheet 18 into a set of rollers 46, that feed the copy sheet into the imaging station 20. Prior to the copy sheet being moved into the imaging station, the master 12 which is to be duplicated is loaded onto a master holder 48, and the master holder is slid in the direction of arrow 50 and slightly raised, to the position indicated at 48A so that it will lie under the path of the copy sheet 18.

After the master holder 48 has been slid and raised to the position 48A, the pusher finger 44 and rollers 46 are activated to move the copy sheet 18 to a position over the master holder at 48A. The holder 48A is then raised slightly so that the master 12 thereon presses upward against the copy sheet 18 which lies on the master, to thereby press the copy sheet against a backing member to keep the master microfiche and copy sheet in close contact with one another. A light source 54 which lies under the master holder at 48A is then energized to direct light through a glass plate of the master holder and through the master microfiche and copy sheet 18, to thereby form an image of the master onto the copy sheet. The master holder 48 is then lowered and the copy sheet 18 is moved by rollers 56 into a set of rollers 58, 60 and up an inclined ramp 62 into another set of rollers 64, 66.

The rollers 64, 66 move the copy sheet far enough that its trailing edge lies forward of a pusher bar 68. The pusher bar 68 is then driven forward to push the copy sheet to the position indicated at 18C, so that the copy sheet then lies in the middle of the developing station 22. The developing station includes a lower plate or base 72 and an upper plate 74 which is mounted a small distance above the lower plate to leave a gap between them through which the copy sheet is received to the position 18C. The lower plate 72 has a groove 76 therein which holds an expandable seal 78 which is in the form of a tube of flexible material. After the copy sheet has been pushed to the position 18C and the pusher bar 68 has been withdrawn so that its leading edge 68e lies behind the seal 78, the seal is inflated by admitting pressured gas, or fluid, from a source 80 through a valve 82 into the inflatable seal. The seal then expands against the upper plate 74 to seal the region which contains the copy sheet, and which forms a thin developing chamber. A developing medium such as anhydrous ammonia is then admitted through a developer input opening 84, to develop the image on the copy sheet. After a developing period, the inflatable seal 78 is deflated to permit the passage of the pusher bar 68 into the developing chamber.

When the copy sheet has been developed and the inflatable seal has been deflated, the pusher bar 68 is again driven forward, but is moved to an extreme forward position wherein its forward end 68e lies at the position 86. The pusher bar thus pushes the copy sheet forward from the position 18C to a position wherein the copy sheet is fed between pairs of rollers 88, 90. The rollers 88, which are driven by a motor 92, continue to move the copy sheet forward until it drops into the output basket 24. The operator can then pick up the microfiche duplicate from the output basket 24. The master holder 48 is lowered and moved out, and the master microfiche 12 can be removed from the master holder.

Figure 2:
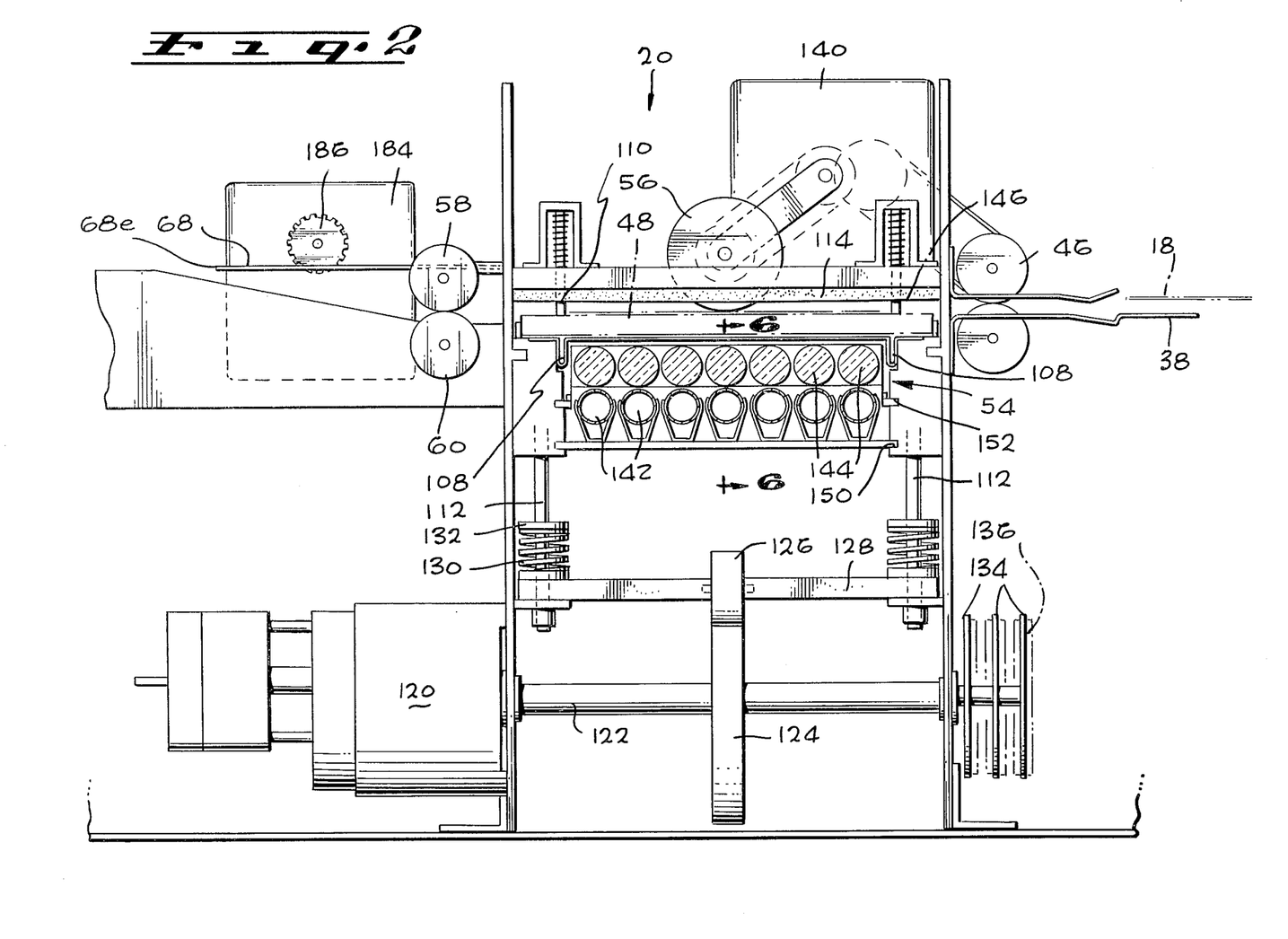
FIG. 2 is a partial front elevation view of the duplicator of FIG. 1.
Figures 3, 4:
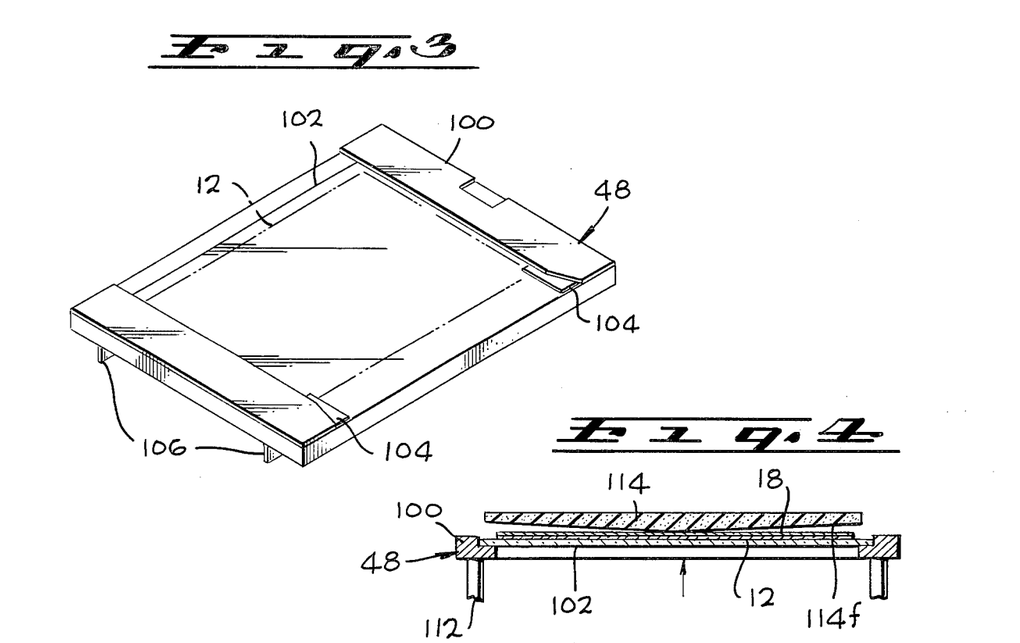
FIG. 3 is a partial perspective view of a master fiche holder of the duplicator of FIG. 1.
FIG. 4 is a partial sectional front view of the imaging station of FIG. 2, shown in a position wherein the master fiche holder is being pressed up to its final position.
Figure 5:
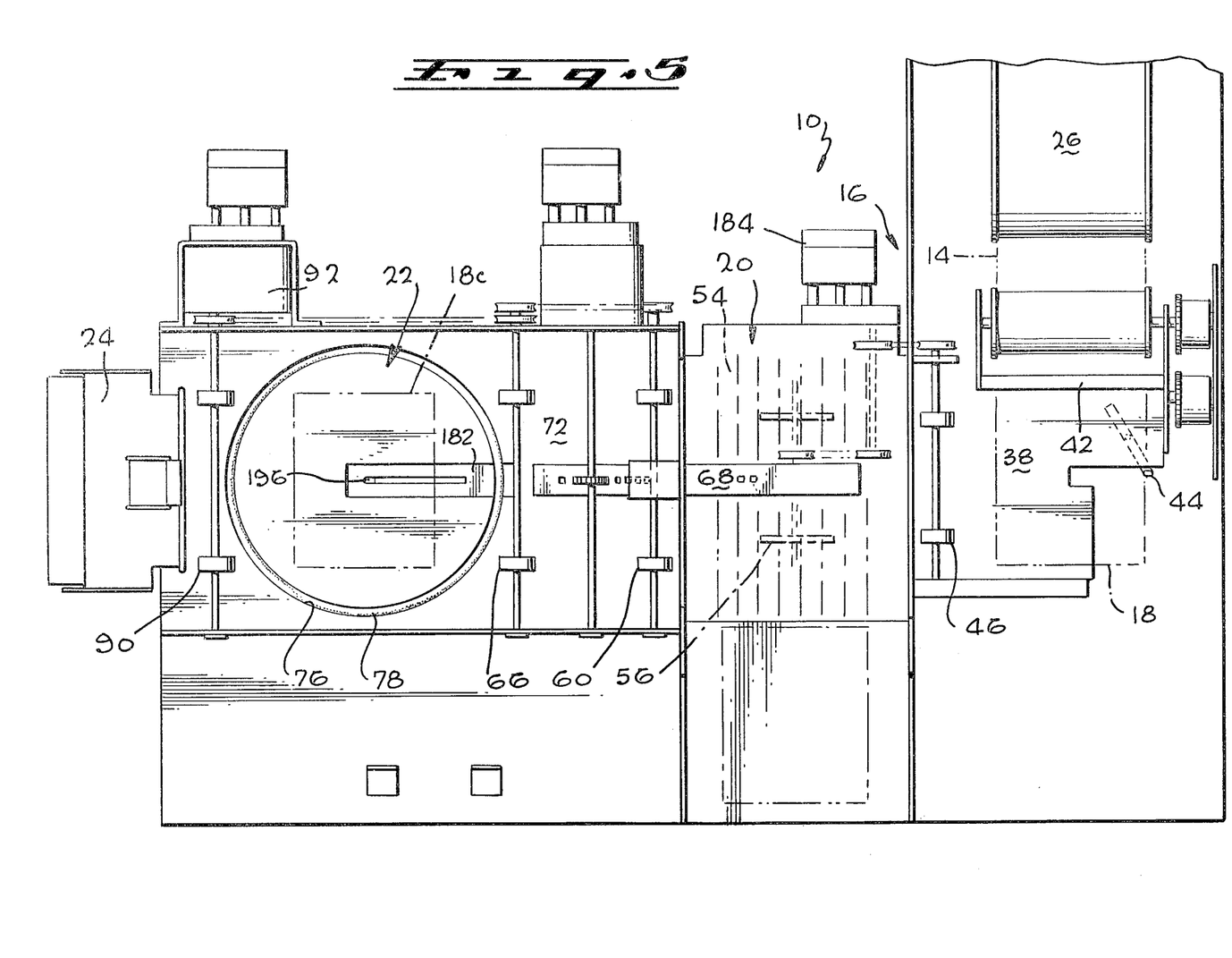
FIG. 5 is a partial sectional plan view of the duplicator of FIG. 2.

FIGS. 2-4 illustrate some of the details of the imaging station 20 where the master microfiche 12 and copy sheet 18 are held together while light from a light source 54 shines at them to expose the copy sheet and form a latent image thereon. The master fiche holder 48, which is shown in FIG. 3, includes a frame 100 with a transparent glass plate 102 for supporting the master microfiche 12, and a pair of resilient shims 104 for holding opposite ends of the microfiche in position. The microfiche 12 is installed by laying it on the plate 102 and slipping it under the shims 104. A pair of rails 106 on the microfiche holder is received in a pair of slots 108 (FIG. 2) of the duplicating machine. After the microfiche has been installed on the holder, the holder 48 is slid in the direction of arrow 50 (FIG. 1) to slightly below the position 48A. When the operator initiates the printing cycle, the master fiche holder 48 is moved up to provide a channel constrained on the bottom by the master fiche 12 and the glass plate 102, on the top by a foam backing plate or backing 114, and on the sides by the guides that lie at the side of the frame 100. The copy sheet 18 is then moved by the finger 44 and rollers 46 towards a position on top of the master microfiche, the roller 56 serving to move the copy sheet against a stop 110 wherein the copy sheet lies directly on the master microfiche.

After the copy sheet has been moved onto the master microfiche, the holder 48 is raised by four pins 112, to press the copy sheet up against the backing 114 to squeeze the copy sheet 18 and master 12 firmly against one another. As shown in FIG. 4, which shows the holder 48 as it is being raised against the backing 114, the backing 114 is a flexible member constructed of elastomeric material such as foam rubber, and has a convex lower face 114f. The convexity of the face 114f serves to avoid entrapment of air between itself and the copy sheet 18, by causing the contact area to gradually expand outwardly as the holder is raised up against the backing.

The pins 112, which raise the microfiche holder 48, are driven up and down by a gear head motor 120 (FIG. 2). The motor 120 turns a cam shaft 122 to turn a cam 124 which raises and lowers a cam follower roller 126. The follower 126 is rotatably mounted on a plate 128 which supports the lower end of four springs 130. The pins 112 have flanges 132 at their lower ends which rest on the upper ends of the springs 130. The springs 130 prevent excessive pressure of the pins 112 on the master microfiche holder. The cam shaft 122 also carries additional control cams 134 which operate switches 136 thereat connected to circuitry (not shown) that operate the light source 54 to expose the microfiche, to energize the motor 120 to move down the pins 112 and the microfiche holder, and to operate the motor 140 that rotates the roller 56 that moves the copy sheet into the next rollers 58, 60 that carry the copy sheet to the developing station.

The light source 54 includes a bank of seven fluorescent aperture lamps 142 and a bank of seven lenses 144 which direct light from the aperture lamps 142 onto an image plane 146 which lies near the level of the lower face of the backing 114, and which is the location of the microfiche during imaging. In those cases where master microfiche which are to be duplicated have no jacket on them, the lenses 144 may not be necessary and, if desired, they may be removed. The support 148 of the aperture lamps can be slid out of one groove 150 and reinstalled in a higher groove 152. However, where jacketed microfiche are to be duplicated, the lenses 144 are desirable in order to provide good resolution.

Figure 6:
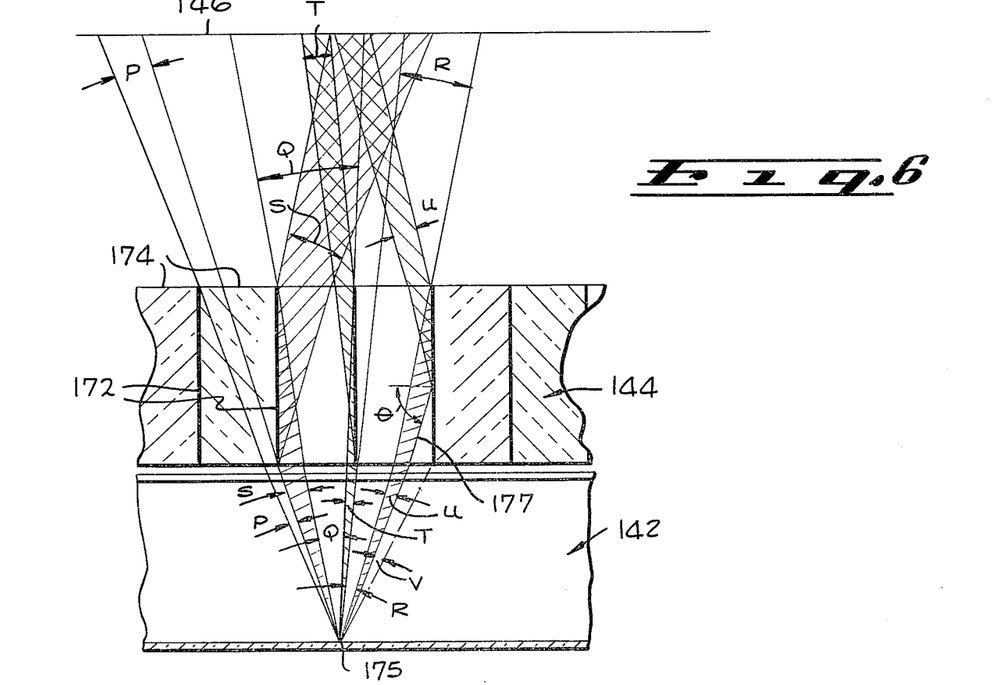
FIG. 6 is a view taken on the line 6—6 of FIG. 2.
Figure 7:
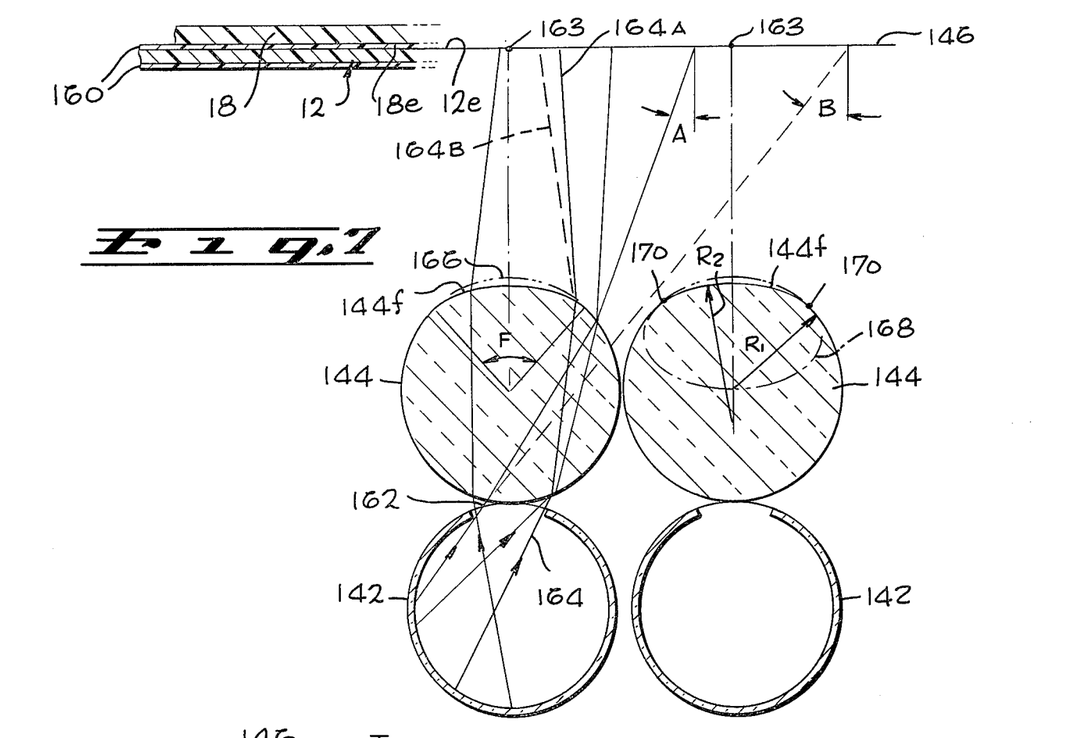
FIG. 7 is an enlarged view of a portion of the apparatus of FIG. 2, showing some of the light rays which extend from a lamp through a lens to the imaging plane.

FIGS. 2, 6, and 7 illustrate details of the lenses 144 which are utilized to create sharp images of the master microfiche 12 onto the copy sheet 18, in spite of there being a jacket about the master microfiche 12, the jacket layers 160 (FIG. 7) typically being on the order of one-half mil (one half of a thousandth of an inch). The master and copy sheets are positioned with their emulsion faces 12e, 18e close together, but even the small separation introduced by one of the jackets 160 could blur the finely detailed image on the copy sheet unless the light is at least moderately collimated. It has been found that light rays oriented at an angle A of up to about 18° from a direction normal to the plane of the master and copy sheets can be utilized to obtain a relatively sharp image, so long as most of the light rays are more nearly collimated. The aperture lamps 142 themselves can produce a relatively uniform illumination across the image plane 146, but they produce an appreciable amount of light rays, such as the ray 162, that would be far from collimated and would blur the image. By utilizing a bank of lenses 144 which are elongated and of substantially constant cross section along their length, such lenses typically being referred to as cylindrical lenses, collimation of the light can be greatly increased. The light ray 162, for example, which would otherwise be incident on the image plane at an angle B of about 40°, is deflected by a lens of circular cross-section so that it is incident on the image plane at an angle A of about 18°.

A lens of constant radius such as $R_1$ (FIG. 7) produces adequately collimated light, but tends to refract most of the light onto locations near points 163 that are in line with the lenses and lamps, leaving alternately bright and dark areas on the film plane. A more even light distribution is produced by flattening the lens 144 along the portion 144f which is closest to the image plane 146. If the lens 144 were circular, a light ray 164 emanating from the aperture lamp would travel along the path 164B so that it would reach the film plane close to the central point 163. However, by flattening the lens along the portion 144f, the ray instead extends along the path 164A which is further from the center of the lens. It is found that in the configuration of FIG. 7, relatively uniform light distribution is obtained by flattening the lens at 144f along an angle F of about 75°, while the rest of the lens periphery is circular. It may be noted that as a result of the flattening along the lens portion 144f, somewhat better collimation of the light is obtained, inasmuch as the light ray path 164A is better collimated than the light ray 164B.

The flattening at 144f could be accomplished by a variety of curves of large radius of curvature or perhaps even by a completely flat surface. However, it is found that a discontinuity between the flattened portion along 144f and the rest of the lens will result in "banding," which is the production of bands of high and low illumination next to each other caused by rays exiting near the discontinuity at the ends of the flattened surface portion, this banding effect being undesirable in that it causes bands to appear on the microfiche. In order to avoid such irregularities in illumination intensity, the flattened portion 144f is formed with a variable radius of curvature $R_2$ which becomes larger near the extreme front of the lens and which approaches the radius $R_1$ in a smooth manner towards the sides of the flattened surface. This is accomplished by forming the flattened region 144f as part of an ellipse 168 which is substantially tangent to the circular portion of the lens at the intersection regions 170. Thus, the aperture lamps 142 are arranged with their forward sides, where the apertures are located, along one plane, and the lenses are positioned in front of the lamps with their forward sides flattened, preferably into an ellipse.

In order to minimize non-collimation along the length of the lenses as would be seen when viewing the side of the lens as in FIG. 6, the lens 144 is constructed with numerous light barriers 172 spaced along its length, which prevent highly non-collimated light rays from reaching the image plane. This is accomplished by forming the lens of numerous sections 174 which are adhesively joined in series by barriers 172 of opaque material which lie between the segments.

If the barriers 172 were formed of opaque material of the same or greater index of refraction than the lens segments 174, then all rays intercepted by barriers 172 would be absorbed by them. In that case, light emitted from a point 175 would reach the film plane 146 only along the arcs P, Q, and R. Three other arcs of light S, T, and U would all be intercepted by two of the barriers. However, this light along the arcs S, T, and U, is fairly well collimated (nearly normal to the image plane) and would be useful in producing greater illumination of the film plane. In order to enable utilization of the arcs of light S, T, and U, the barriers 172 are constructed of material of slightly lower index of refraction than that of the lens segments 174. For example, the lens segments 174 are constructed of a modified styrene plastic having a relatively high index of refraction of 1.56. The opaque bonding material of the barriers 172 is of a substantially opaque urethane material of an index of refraction of about 1.50 and which will form a good bond with the lens segment material.

As a result of the lower index of refraction of the barrier material of barriers 172 than the lens material of lens segments 174, light rays such as 177 that strike a barrier at a low angle will be totally reflected off the barrier. This is a well-known phenomenon, wherein there is a critical angle $\theta$, as measured between an imaginary line normal to the surface and the light ray incident on the surface, and wherein all light rays incident at an angle greater than $\theta$ are totally reflected. The angle $\theta$ can be determined by the equation $\sin\theta = n_1/n_2$, where $\theta$ is the critical angle, $n_1$ is the index of refraction of the medium which totally reflects the light ray (e.g., the material of barriers 172), and $n_2$ is the index of refraction of the medium in which the light ray travels towards and away from the totally reflecting medium (e.g., the material of lens segments 174). For barriers 172 of a 1.50 index of refraction and lens segments 174 of a 1.56 index of refraction, the critical angle is about 75°. Thus, the light ray 177 which extends at the critical angle will be totally reflected, as will be the entire segment U. In a similar manner, the entire segments of light S and T will be totally reflected. Only the poorly collimated light segment V will be absorbed by the barrier. The resulting increase in average illumination by relatively well collimated light beams is considerable, and appreciably decreases the required exposure time. Instead of placing the barriers and lens segments in intimate contact, it would be possible to leave thin air gaps between them; however, this would result in a critical angle of about 50°, which would result in highly uncollimated light being refracted to reach the film plane. A critical angle of at least about 65° is desirable, so that only fairly well collimated light will be refracted. A 65° critical angle is achieved with a ratio of indexes of refraction of at least 0.90.

The lens 146, which has numerous barriers 172, is useful especially where jacketed microfiche are to be copies, where the jacket may have a face sheet with a thickness as much as 0.0005 inch which could lead to considerable image degradation unless the light is reasonably well collimated. Where unjacketed microfiche are to be copied, the lamps can be utilized in their higher position and without lenses, to enable shorter exposure times to be utilized at some sacrifice in image quality. Where high image quality is desired, relatively good collimation is required even with non-jacketed microfiche. This is because there is often a slight spacing between the microfiche and copy sheet due to dust lying between them. High image quality can be achieved in such circumstances by utilizing lenses similar to 144, but with the lenses being continuous instead of having numerous barriers, to reduce the cost of the lenses and to increase the amount of illumination. The barriers are not needed because less collimation is permissable.

Figures 8, 9:
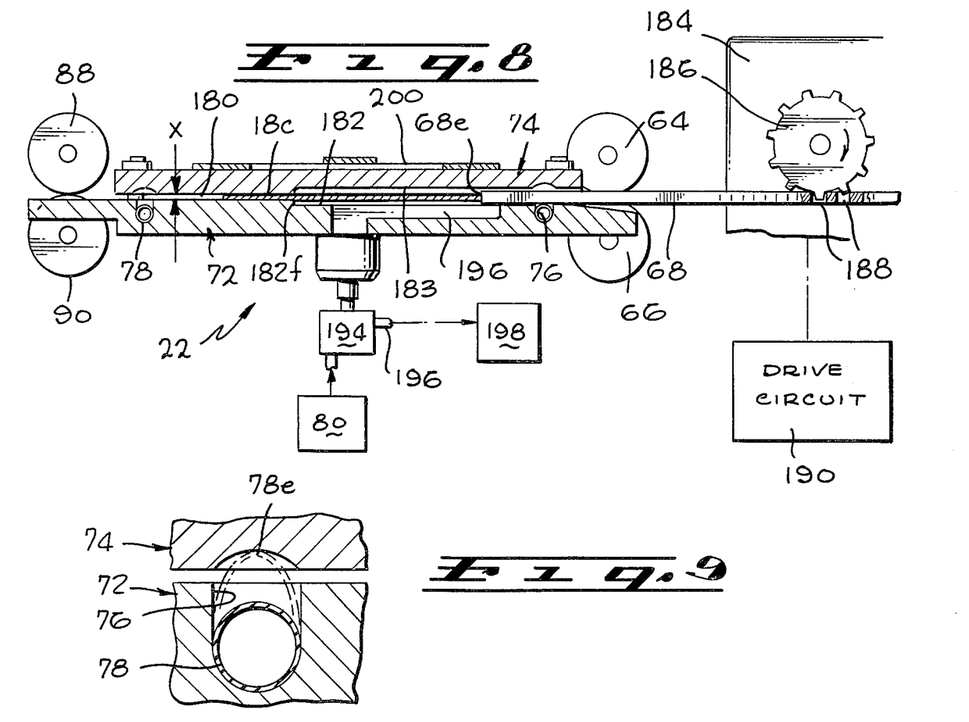
FIG. 8 is a view taken on the line 8—8 of FIG. 1, showing the developer station thereof, but with the pusher strip in a partial forward position.
FIG. 9 is an enlarged sectional view of a portion of the developer station of FIG. 8.

FIGS. 1, 8 and 9 illustrate details of the developing station 22, where an exposed copy sheet at 18C is immersed in a developing medium. The two plates 72, 74 are held a small distance apart x which is greater than the thickness of the copy sheet 18C, so that when the inflatable seal 78 is expanded to the position 78e, the enclosed region forms a wide and thin developing chamber 180. The recess 76 in the lower plate which holds the inflatable seal, is deeper than the uninflated seal, to permit the copy sheet to move over the seal. The inflatable seal is adhesively fastened to the bottom wall of the recess 76 to hold down the seal. The small volume of the chamber 180 is useful in minimizing the amount of developing medium that must be fed into the chamber and disposed of after each developing cycle. The movement of the copy sheet into the chamber and then out of it, is accomplished by means of the push bar 68 which is a thin member that can slide into the space between the two plates 72, 74 to push the copy sheet ahead of it. The copy sheet is relatively thin, and it would be possible for a thin pusher bar to slide over such a sheet. To prevent this, grooves 182, 183 are formed in the lower and upper plates, which are wide enough to receive the front portion of the pusher bar 68 but which are narrow enough that the copy sheet cannot deflect substantially into them. The pusher bar 68 is thick enough that it lies in both grooves 182, 183, so that the leading edge of the pusher bar cannot deflect over or under the copy sheet 186.

The pusher bar 68 is moved by a motor 184 which drives a gear 186 that engages sprocket holes 188 spaced along the pusher bar that form a gear tooth-like rack. A drive circuit 190 which energizes the motor, is a microprocessor with standard logic, which is programmed to first energize the motor in a forward direction to drive the pusher bar 68 to the position illustrated in FIG. 8 and then to withdraw the pusher bar so that its leading end 68e lies behind the inflatable seal 78. The seal 78 is then inflated to seal the thin chamber 180 which contains the copy sheet 18C. A developing fluid such as anhydrous ammonia gas is then admitted under high pressure from a source 80 through a control valve 194 and through a slot 196 that leads to the chamber 180. After a few seconds, during which the copy sheet is developed, the ammonia is evacuated through the valve 194 through an outlet 196 that leads to a water bath 198 that absorbs the ammonia. The seal 78 is then deflated. The drive circuit 190 then energizes the motor 184 in a forward direction to move the pusher bar 68 forward again, to a more forward position close to the front 182f of the groove. This pushes the copy sheet 18 forward enough that it is captured between the rollers 88, 90, which then move the copy sheet to the output basket.

The copy sheet 18 has a diazo emulsion, which can be developed by the use of aqueous ammonia or by the use of anhydrous ammonia. Anhydrous ammonia is preferred, inasmuch as it minimizes the developing time. Typically, anhydrous ammonia at a pressure of approximately 25 p.s.i. is applied to the developing chamber 180 for approximately two seconds while the chamber is maintained at a temperature such as 140° F. by a heater 200. Most of the anhydrous ammonia is then evacuated to the water bath 198 and the seal 78 is deflected. The small volume of the developing chamber results in only a small amount of ammonia gas being dumped into the atmosphere. In order to minimize the cost of the duplicating machine, the same source 80 which supplies developing fluid to the developing chamber, is utilized to inflate the seal 78. Of course, none of the gas in the inflatable seal is dumped into the atmosphere.

Thus, the invention provides a copying system with improved imaging and developing stations and with a simplified mechanism for moving copy sheets through the machine. The imaging station includes a bank of aperture lamps which provide relatively uniform illumination, and a bank of elongated lenses divided into separated sections and with flattened forward sides to provide relatively collimated light for the duplicating of jacketed microfiche. The developing station is formed by closely spaced plates and an inflatable seal for sealing a region between the plates that forms a developing chamber. The movement of copy sheets through the developing chamber is accomplished by a thin pusher bar which can push the copy sheet into the chamber and then withdraw, and which then can be extended to push the copy sheet out of the copy chamber.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A contact copying apparatus comprising:
   means for holding a light-transmitting master containing an image to be copied and a sheet of copy material, facewise adjacent to one another at a predetermined imaging plane;
   a plurality of elongated and closely spaced aperture lamps, each having a tube of substantially circular cross section with light emanating principally from the inside of the tube, and an elongated aperture through which light is emitted, each of said lamps being spaced approximately the same distance from said predetermined imaging plane; and a plurality of elongated and closely spaced lenses, each positioned between one of said aperture lamps and said imaging plane for directing light from said aperture lamps onto said imaging plane;
   each lens being close enough to the corresponding lamp so that substantially all light emitted from the lamp aperture can reach only the lens immediately in front of that lamp, but each lens being spaced from the position of the master by more than the radius of the lens to enable spreading out of the light to more evenly distribute the light onto the imaging plane;
   each of said lenses being formed by a plurality of lens segments arranged along an axis parallel to said elongated aperture and a plurality of opaque barriers between said lens segments, said barriers being of a material having an index of refraction which is greater than that of air but lower than the index of refraction of the adjacent lens segment, whereby well collimated light rays are passed through said lenses and poorly collimated light rays are absorbed by said barriers.

2. An apparatus according to claim 1 wherein:
   the cross section of each lens has a first predetermined radius of curvature along most of the lens periphery including a first side thereof nearest a corresponding aperture lamp, said lens cross section having a larger radii of cuvature along a second side opposite the aperture lamp.

3. An apparatus according to claim 1 wherein:
the second side of each lens is in the form of an ellipse that is tangent to portions of said lens on either end of said second side.

4. An apparatus according to claim 3 wherein:
said ellipse extends along an angle of approximately 70° with respect to the center of said lens, and said lens is circular about the rest of its periphery.

5. An apparatus according to claim 1 including:
means for removably holding said lens at a predetermined lens position; and
means for removably holding said aperture lamps at a first position further from said image plane than said lenses, and at a second position closer to said image plane than at said first position, said lamps at said second position occupying the same space which would be occupied by said lenses when they are held at said lens position, whereby to permit the lamps to be moved closer to the film plane when the lenses are not used.

* * * * *